May 14, 1957 L. D. FAAS 2,791,875
LAWN MOWING AND TRIMMING MACHINE
Filed March 3, 1953 3 Sheets-Sheet 1
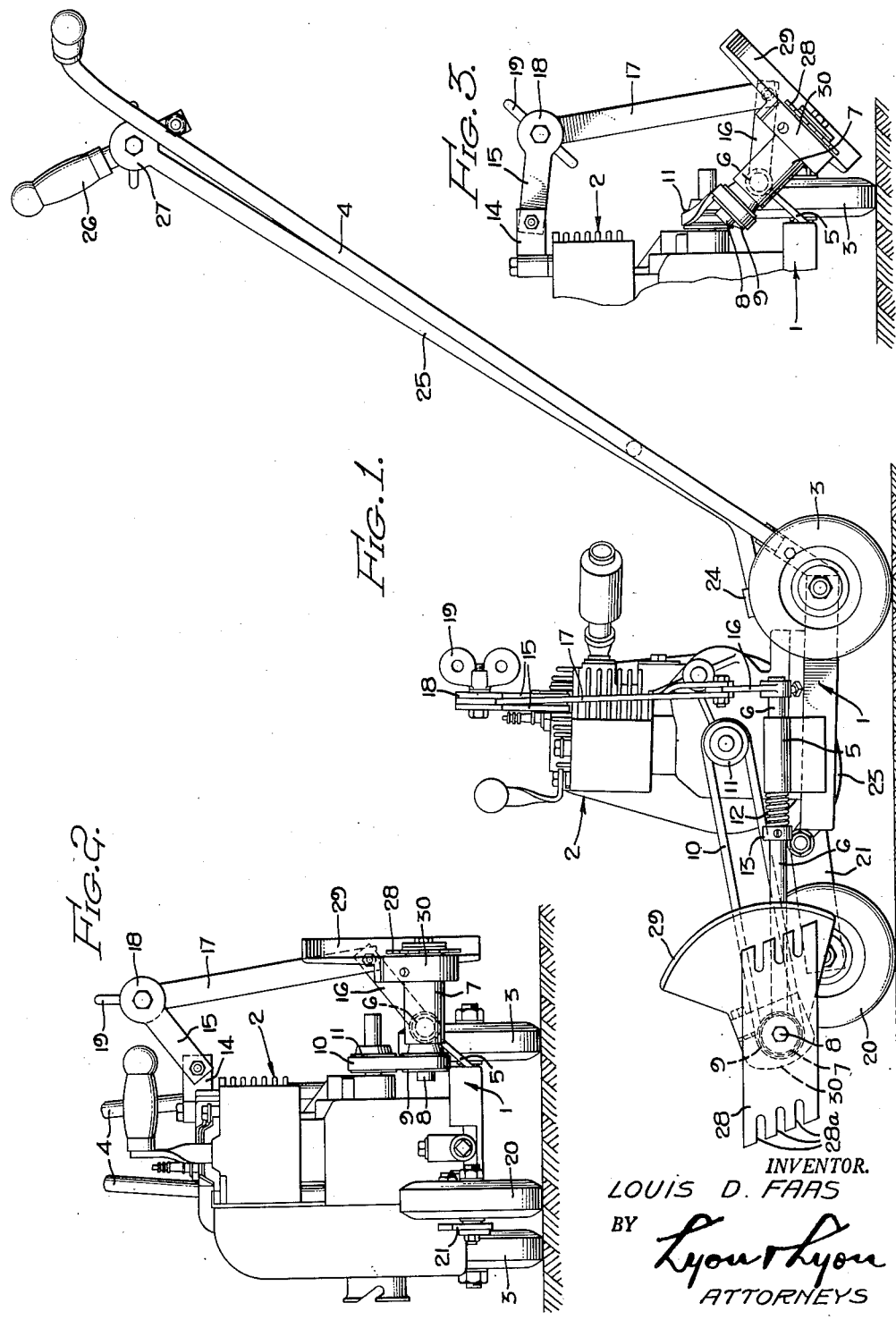
INVENTOR.
LOUIS D. FAAS
BY Lyon & Lyon
ATTORNEYS

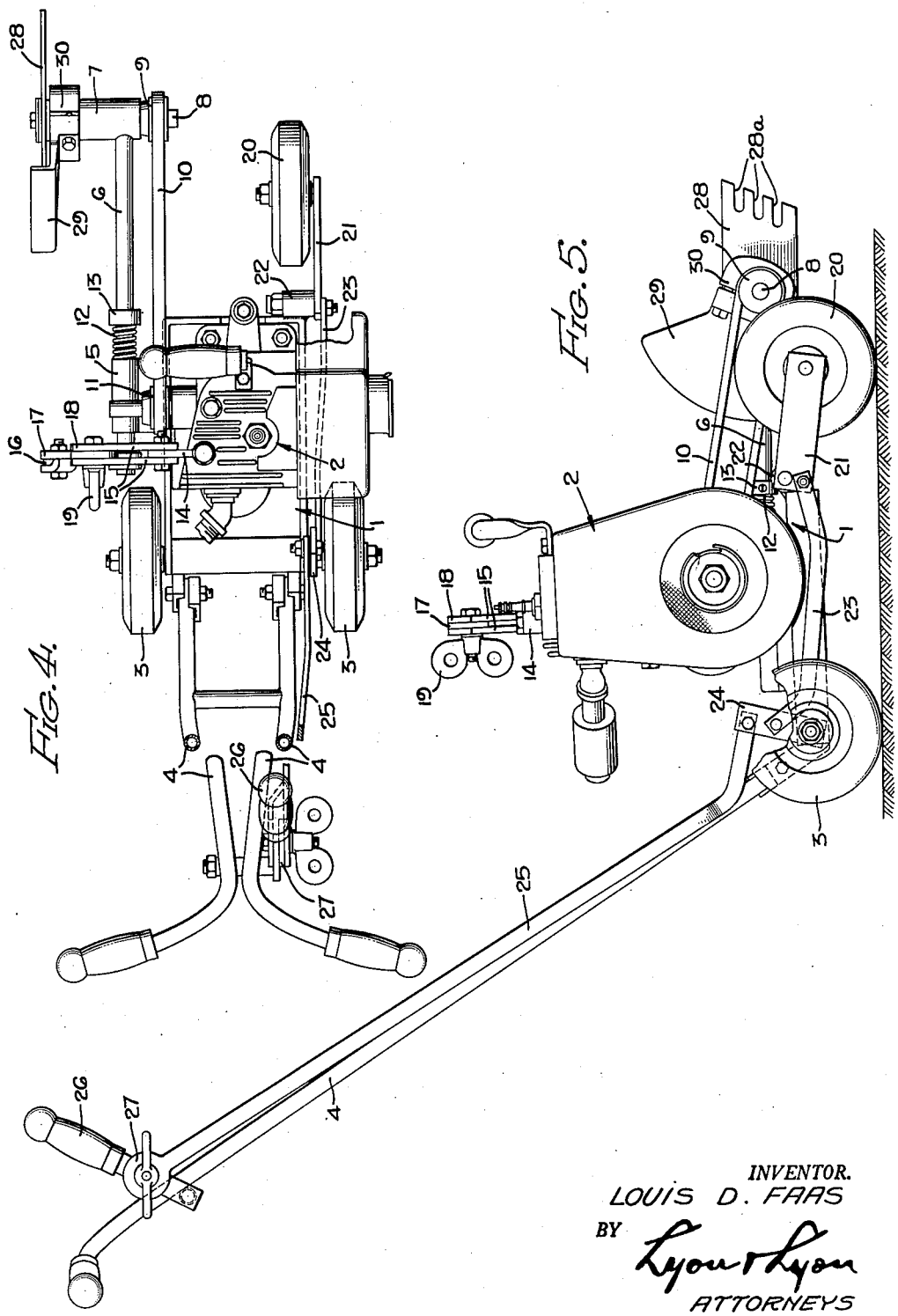

May 14, 1957 L. D. FAAS 2,791,875
LAWN MOWING AND TRIMMING MACHINE
Filed March 3, 1953 3 Sheets-Sheet 3
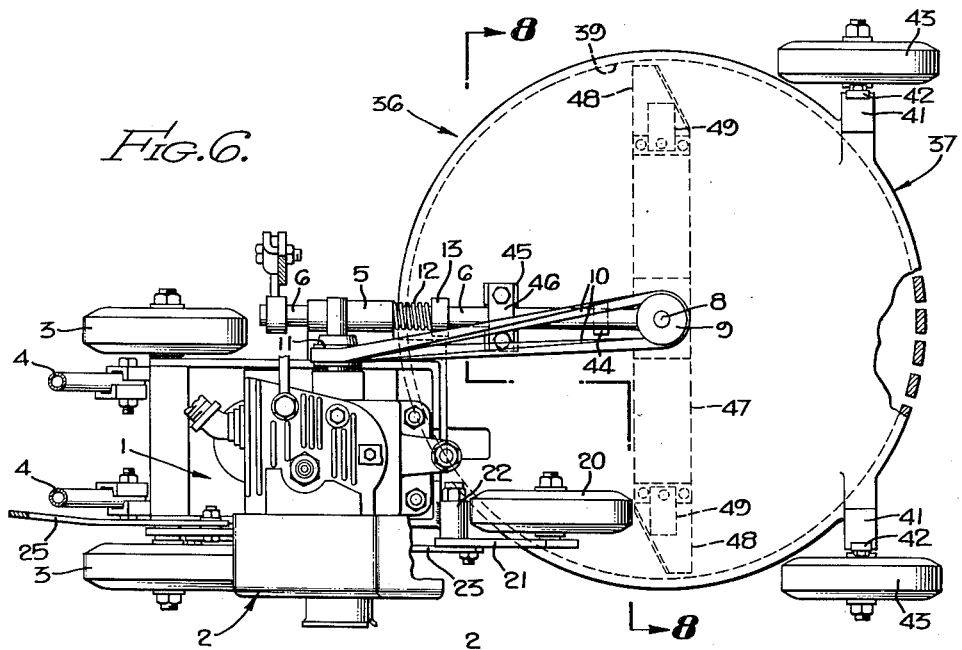
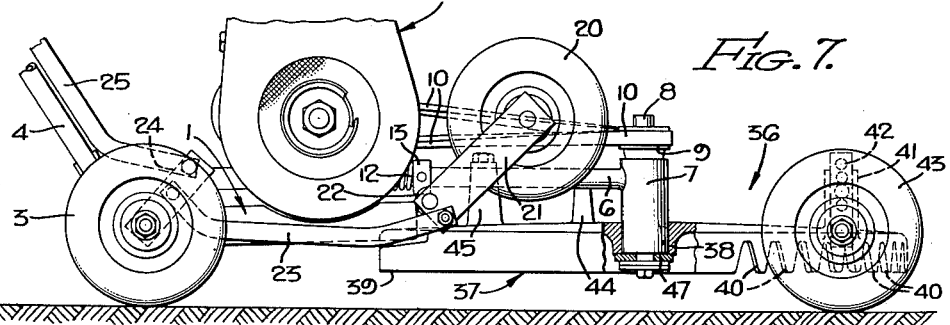
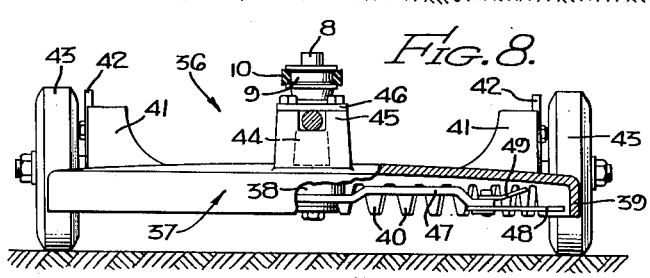
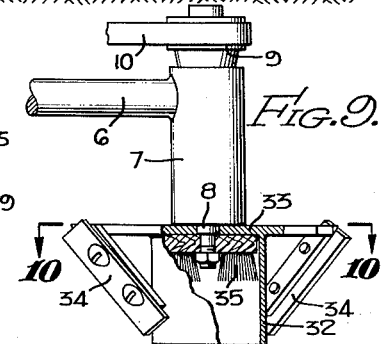
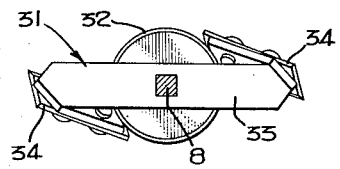
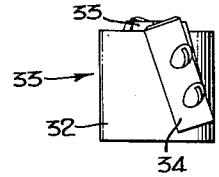
INVENTOR.
LOUIS D. FAAS
BY Lyon & Lyon
ATTORNEYS United States Patent Office 2,791,875
Patented May 14, 1957

2,791,875

LAWN MOWING AND TRIMMING MACHINE

Louis D. Faas, South Gate, Calif.

Application March 3, 1953, Serial No. 340,112

1 Claim. (Cl. 56—25.4)

My invention relates to lawn mowing and trimming machines, and included in the objects of my invention are:

First, to provide a lawn mowing and trimming machine which is so constructed that a series of attachments may be mounted thereon to perform a wide range of operations necessary in the care of lawns, such as, mowing, trimming of lawn edges and the cleaning of lawn sprinklers.

Second, to provide a machine of this class which, when adapted for lawn edging operations, incorporates control means whereby the edger may be moved from a vertical to a horizontal position and raised or lowered, all while in operation and without requiring the operator to approach close to the cutting blade.

Third, to provide a machine of this class, which, by simple adjustment and interchange of cutting blades, may be converted into a device for trimming or cleaning the grass from around sprinkler heads.

Fourth, to provide a machine of this class, which, by simple adjustment and substitution of a mowing head, may be converted into a mowing machine capable of cutting and mulching the grass so as to eliminate the need of a grass catcher or subsequent raking of the grass.

Other objects and advantages of this invention will be apparent from the following detailed description of a preferred embodiment thereof as illustrated in the accompanying drawings in which:

Figure 1 is a side view of my lawn mowing and trimming machine shown equipped with a lawn edger or trimmer.

Figure 2 is a front view thereof.

Figure 3 is a fragmentary front view thereof showing the lawn edger attachment in an angular position.

Figure 4 is a top or plan view thereof.

Figure 5 is a side view thereof showing the side opposite from Figure 1.

Figure 6 is a plan view showing my machine equipped with a lawn mowing attachment.

Figure 7 is a fragmentary side view thereof.

Figure 8 is a transverse sectional view thereof taken substantially through 8—8 of Figure 6.

Figure 9 is a fragmentary view showing a sprinkler head trimming attachment.

Figure 10 is a sectional view through 10—10 of Figure 9 showing the sprinkler head trimming attachment as viewed from above.

Figure 11 is a side view of the sprinkler head trimming attachment.

My lawn mowing and trimming machine includes a rectangular frame 1 on which is mounted a motor 2. In the illustration the motor is shown as a small internal combustion engine, however, an electric motor may be used if desired.

The frame 1 is supported by a pair of rear wheels 3 and attached to the rear end of the frame 1 are upwardly and rearwardly extending handle bars 4. Secured to one side of the frame 1 is a bearing bracket 5 having a horizontal bore which receives a mounting rod or supporting arm 6. The mounting rod 6 extends horizontally and forwardly and terminates in a bearing head 7 disposed at right angles. The bearing head carries a cutter shaft 8, one end of which protrudes from the bearing to receive the pulley 9. The pulley 9 is connected by a belt 10 to a drive pulley 11 mounted on a shaft which extends horizontally from the motor 2.

The mounting rod 6 is capable of longitudinal as well as rotational movement in the bore of the bearing bracket 5. In order to maintain the belt 10 under tension the mounting rod 6 receives a spring 12 which is compressed between the bearing bracket 5 and a collar 13 secured to the mounting rod. The spring tends to force the mounting rod 6 forwardly and place the belt 10 under tension.

Secured to the upper portion of the motor 2 is a bracket 14. Pivotally connected to the bracket 14 is an arm 15. A similar arm 16 is secured to the mounting rod 6. The arms 15 and 16, which are in substantial parallelism, are pivotally joined by a connecting bar 17. The connection between the connecting bar 17 and the arm 15 is enlarged to form a friction clamp 18 which includes a hand screw 19 so that the arms 15 and 16 and connecting bar 17 may be locked in various angular positions. With this arrangement the angular position of the bearing head 7 and cutter shaft 8 may be adjusted, that is, the cutter shaft may be moved from a horizontal transverse position, such as shown in Figures 1, 2, 4 and 5, through an intermediate angular position, such as shown in Figure 3, to a vertical position, such as shown in Figures 6 and 7.

A forward wheel 20 is provided, which is pivotally connected to the frame 1 by a strut 21. The forward wheel is located in lateral offset relation to the bearing head 7 and is capable of substantially vertical adjustment. The strut 21 is journaled in a bearing 22 provided on the frame 1 and is connected by a link 23 extending rearwardly along the side of the frame 1 to a lever arm 24 which is pivotally mounted on the shaft which supports the rear wheels 3.

The lever arm 24 in turn is joined to an operating bar 25 which extends upwardly along one of the handle bars 4 and is pivotally connected to a hand lever 26 which is pivotally supported from the handle bars 4.

The connection between the operating bar 25 and the lever 26 is joined by a friction screw clamp 27 similar to the friction screw clamp 18 for the purpose of locking the forward wheel 20 at any desired elevation and, thus, permit the height of the bearing head 7 and its cutter shaft 8 to be adjusted.

The cutter shaft 8 is capable of operating several attachments. One of these attachments is a trimmer or edger blade 28, which consists of a flat strip having teeth 28a formed at its ends. A segmental guard 29 is adapted to be secured to the bearing head 7 by clamp means 30. The guard is provided with a rim which overlies the extremities of the trimmer blade 28.

My machine, in its utilization of the trimmer blade 28, is operated as follows:

The trimmer blade may be set at the vertical position, such as shown in Figures 1 and 2, or may be set in an angular position, such as shown in Figure 3. The height of the cutting path is determined by adjustment of the forward wheel 20. The machine is then moved along the sidewalk or path bordering a lawn with the cutter blade overlying the margins of the lawn or the machine may be moved along the lawn itself. Rotation of the cutter blade as the machine is moved along either trims the grass vertically or on a bevel, depending on the adjustment of the bearing head.

Similar operation is involved in trimming around trees or garden spots. Not only may the cutter be set at an angular position, such as shown in Figure 3, but the bearing head may be adjusted until the trimmer blade is in a horizontal position, in which case the trimmer blade is capable of acting as a mowing cutter and the height at which the grass is cut is determined by adjustment of the forward wheel 20.

Reference is now directed to Figures 9, 10 and 11. In the construction here shown a sprinkler head trimming unit 31 is substituted for the blade 28 and guard 29. The sprinkler head trimming unit includes a cup or cylindrical member 32, which is secured to the cutter shaft 8 to rotate therewith. The cylindrical member 32 is open at its lower end and its upper end is provided with a cross bar 33 welded thereto. Secured between the extremities of the cross bar 33 and sides of the cylindrical member is a pair of cutter blades 34. These blades extend in a substantially 45° angle and are canted relative to a vertical plane so that as the trimmer unit is rotated the cutter blades tend to cut a conical figure of revolution. The sprinkler head trimmer unit is employed as follows: It is moved from place to place by adjusting the forward wheel 20 so that the sprinkler head trimmer unit is raised clear of the grass. To bring the unit into operation the forward wheel 20 is raised in order to lower the cup member 30 over a sprinkler head. As the cup member is lowered the blades 34 trim the grass around the sprinkler head. If desired, a circular brush 35 may be set in the cup 32 so that as the cup is lowered over the sprinkler head the brush 35 may be brought into operation to clean accumulations in and around the nozzle of the sprinkler head.

Reference is now directed to Figures 6, 7 and 8. While the trimmer blade, when turned to a horizontal position, may function as a mower, the swath covered thereby is relatively limited. In order to cut a larger swath, a mower unit 36 is provided. The mower unit includes a guard disk 37 which is in the form of a large flat circular blade having a central hollow boss 38 which is adapted to receive an end of the bearing head 7 when this member is turned to a vertical position. The guard disk 37 is provided with a depending skirt 39, the forward portion of which is provided with a series of slots to form rake-like teeth 40. The forward portion of the guard disk is provided with laterally extending brackets 41 having vertical guideways which receive wheel struts 42 adapted to be secured at various elevations; that is, the wheel struts are provided with a series of holes through which bolts may extend to secure the struts in different positions. Each wheel strut is provided with a lateral shaft on which is mounted a wheel 43.

In order to position the bearing head 7 in proper relation to the guard disk 37 the mounting rod 6 rests on a spacer boss 44 and on a clamp boss 45 spaced rearwardly therefrom. The clamp boss 45 receives a clamp bar 46 which fits over the mounting rod and is secured to the clamp boss by suitable bolts.

The forward wheel 20 is moved to a raised position in order to clear the top of the guard disk 37 and, of course, is not in use when the mower unit is attached.

The cutter shaft 8 receives a cutter bar 47 in the form of a metal strip. Each extremity of the cutter bar receives a cutter blade 48 which is preferably bolted thereto so that it may be replaced when worn. Each cutter blade is provided with a sharpened leading edge.

In addition to the cutter blades, each extremity of the cutter bar may carry a second shorter blade 49 mounted above the cutter blade 48 contiguous to the underside of the guard disk. The horizontal cutter blades 49 serve to recut grass engaged by the main cutter blades so that the net effect of the two sets of blades is to cut the grass into short lengths so that the severed grass tends to sift downwardly through the uncut grass, acting as a mulch and eliminating the need of collecting the severed grass or raking it from the lawn.

Having fully described my invention, it is to be understood that I do not wish to be limited to the details herein set forth, but my invention is of the full scope of the appended claim.

I claim:

The combination with a lawn trimming and edging machine, having a frame, a pair of rear wheels supporting the frame, a forward wheel adjustably connected to said frame and movable to an elevated position, a bearing head, means for disposing the bearing head forwardly and to one side of said frame, said means permitting turning of said bearing head between a vertical position and a transverse horizontal position, a shaft journalled in said bearing head, and a motor on said frame operatively connected with said shaft, of a cutting attachment, comprising: a circular guard having a central mounting recess adapted to receive an end of said bearing head, when said bearing head is in a vertical position, said guard being separate from said frame and a margin of said guard adapted to fit under said forward wheel, when said forward wheel is raised; auxiliary wheels for supporting said guard; and a cutter blade disposed under said guard and attached to said shaft.

References Cited in the file of this patent

UNITED STATES PATENTS

| | | |
|---|---|---|
| 2,504,259 | Ford | Apr. 18, 1950 |
| 2,529,870 | Golasky | Nov. 14, 1950 |
| 2,568,822 | Pervis | Sept. 25, 1951 |
| 2,608,043 | Berdan | Aug. 26, 1952 |
| 2,618,919 | Hutchens | Nov. 25, 1952 |
| 2,680,339 | Murphy | June 5, 1954 |
| 2,691,264 | Miller | Oct. 12, 1954 |